R. D. CHURCH.
CULTIVATING HOE.
APPLICATION FILED DEC. 31, 1920.

1,387,127.

Patented Aug. 9, 1921.

INVENTOR.
RALPH D. CHURCH.
BY HIS ATTORNEY.
James F. Williamson

UNITED STATES PATENT OFFICE.

RALPH D. CHURCH, OF DALLAS, TEXAS.

CULTIVATING-HOE.

1,387,127.  Specification of Letters Patent.  Patented Aug. 9, 1921.

Application filed December 31, 1920. Serial No. 434,267.

*To all whom it may concern:*

Be it known that I, RALPH D. CHURCH, a citizen of the United States, residing at Dallas, in the county of Dallas and State of Texas, have invented certain new and useful Improvements in Cultivating-Hoes; and I do hereby declare the following to be a full, clear, and exact description of the invention, such as will enable others skilled in the art to which it appertains to make and use the same.

This invention relates to an agricultural implement and particularly to such an implement designed to be used as a cultivating hoe, a weeder or grubbing implement.

It is an object of this invention to produce such an implement, the operating part of which is formed in the shape of a segment of a sphere so that the entire edge of it can be used and new parts brought into use as other parts thereof become dulled. It is a further object of the invention to produce a device of the form above set forth which can be used for a great variety of operations in a garden.

Another object of the invention is to provide a simple and efficient fastening means to secure such an implement to its operating handle.

These and other objects and advantages of the invention will become apparent from the following description made in connection with the accompanying drawings in which like reference characters refer to the same parts throughout the different views, and in which Figure 1 is a central longitudinal section of the operating part of the device and also showing a handle attached thereto;

Figure 1:
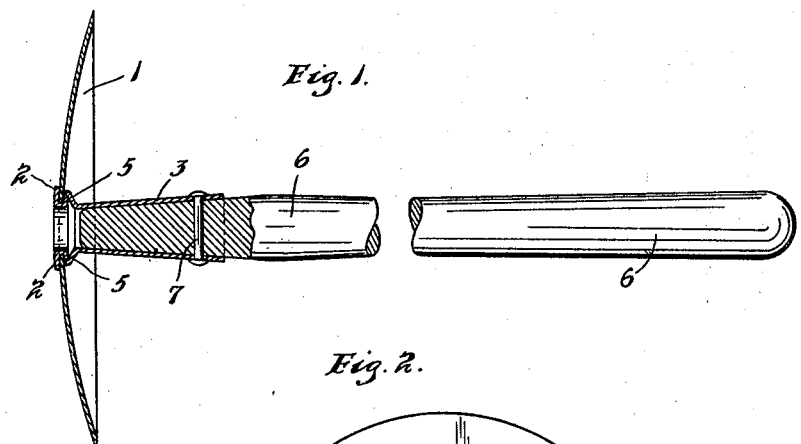
Figure 2:
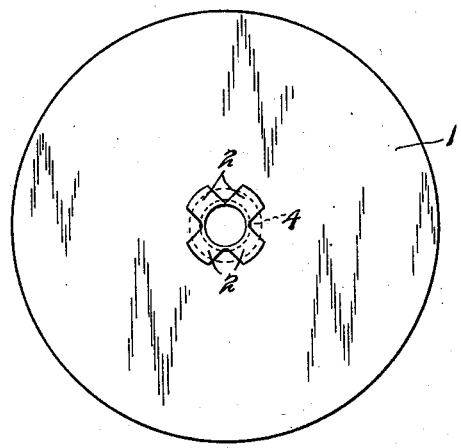
Fig. 2 is an end view of the device as seen from the left in Fig. 1.
Figure 3:
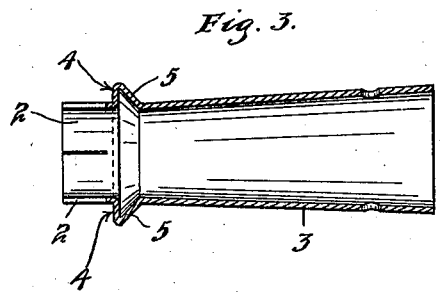
Fig. 3 is a central longitudinal section of the fastening element shown on an enlarged scale.

Referring to the drawings, the device is seen to comprise a disk 1 formed in the shape of a segment of a spherical surface and having its circumferential edge sharpened. This disk is provided with a central aperture through which extends from the inside a plurality of lugs 2 formed at one end of a tapered cylindrical member 3. This member is expanded at one end to form a shoulder portion 4 which extends in a plane at right angles to the axis of the member 3 and connects with another expanded portion 5 of conical formation which, in turn, connects with the tapered cylindrical body of said member. The portions 4 and 5 therefor constitute a collar extending about the member 3, substantially pointed or V-shaped in cross section. The disk member 1 is disposed on the member 3 with the inner portion in contact with the shoulder or flange 4 and the lugs 2 or the end of members 3, are then upset or bent outwardly into close contact with the outside portion of the disk. The disk is thus firmly and securely held on the member 3. A handle 6 of suitable size and shape has its end tapered to fit snugly into the member 3 and is secured against displacement therefrom by a transverse rivet 7 or other suitable fastening means.

The device will preferably be made of metal and can be made of any size desired. If used for light garden work, as a weeder or cultivator, the disk 1 can be made comparatively thin to form a light convenient tool. If the device is intended for grubbing work, such as clearing roots or working rough ground, the disk can be made correspondingly heavier. By a suitable choice of size and weight, the device forms a tool having a great many applications of utility.

It will be noted that the device is extremely simple, comprises few parts and is of such structure that it will give very little trouble in the operation. It will, of course, be understood that various changes in the form and proportions of the device may be made without departing from the scope of applicant's invention, which generally stated, consists in the matter shown and described and set forth in the appended claims.

What is claimed is:

1. A garden implement comprising a circular disk having a continuous cutting edge formed thereon and an operating handle secured at the center thereof.

2. A garden implement comprising a disk formed in the shape of a segment of a sphere having its edge sharpened to form a continuous operating edge and a handle secured at the center thereof.

3. A hoe comprising a disk formed as a segment of a sphere, a handle attaching member rigidly secured to and extending from the same centrally of the concave side thereof and a handle rigidly secured to and extending from said handle attaching member.

4. A hoe comprising a convex disk member and a handle secured to the same centrally thereof and extending in a straight line from the concave side thereof.

In testimony whereof I affix my signature in presence of two witnesses:

RALPH D. CHURCH.

Witnesses:
WADE H. WILLIAMS,
J. D. LANDRUM.